United States Patent [19]
Abels

[11] Patent Number: 5,938,237
[45] Date of Patent: Aug. 17, 1999

[54] DRIVER RESTRAINT DEVICE FOR AN INDUSTRIAL TRUCK

[75] Inventor: Theodor Abels, Aschaffenburg, Germany

[73] Assignee: Linde Aktiengesellschaft, Germany

[21] Appl. No.: 08/812,205

[22] Filed: Mar. 6, 1997

Related U.S. Application Data

[63] Continuation-in-part of application No. 08/547,701, Oct. 19, 1995, abandoned.

[30] Foreign Application Priority Data

Oct. 20, 1994 [DE] Germany .............................. 44 37 569
Mar. 13, 1995 [DE] Germany ........................... 195 08 990

[51] Int. Cl.$^6$ .............................. B60R 21/13; B60R 21/02
[52] U.S. Cl. ........................ 280/753; 180/282; 297/216.1; 297/488
[58] Field of Search .................................... 280/753, 751, 280/748, 749; 180/282, 274, 271, 268; 297/487, 488, 216.1

[56] References Cited

U.S. PATENT DOCUMENTS

| 2,873,122 | 2/1959 | Peras ........................................ 180/271 |
| 3,623,768 | 11/1971 | Capener et al. ........................ 280/753 |
| 3,640,572 | 2/1972 | Doehler .................................... 280/751 |
| 3,734,533 | 5/1973 | Lang ........................................ 280/753 |
| 3,804,435 | 4/1974 | See et al. ................................ 280/753 |
| 3,899,042 | 8/1975 | Bonar ...................................... 280/753 |
| 4,579,191 | 4/1986 | Klee et al. .............................. 180/268 |
| 5,205,585 | 4/1993 | Reuber et al. .......................... 280/753 |

FOREIGN PATENT DOCUMENTS

| 4-43140 | 2/1992 | Japan ..................................... 280/753 |
| 2144323 | 3/1985 | United Kingdom . |
| 2277869 | 11/1994 | United Kingdom ................... 297/488 |

OTHER PUBLICATIONS

United Kingdom Search Report, Jan. 30, 1996, 1 p., Application No. GB9521389.8.

Primary Examiner—Peter C. English
Attorney, Agent, or Firm—Webb Ziesenheim Logsdon Orkin & Hanson, P.C.

[57] ABSTRACT

A driver restraining device is located in the driver's cab of an industrial truck having a driver's seat in the cab. The restraining device includes a contact member for the driver mounted in the cab and movable between a first retracted position and a second driver restraining position to prevent substantial movement of the driver's body relative to the driver's seat upon tipping of the truck. A tripping arrangement is operatively connected to the contact member to move the contact member between the first retracted position and the second driver restraining position and a detector for detecting the tipping motion of the industrial truck is operatively connected to the tripping arrangement to actuate the tripping arrangement to move the contact member from the first retracted position to the second driver restraining position and to lock the contact member in the second driver restraining position.

17 Claims, 6 Drawing Sheets

FIG. 11

# DRIVER RESTRAINT DEVICE FOR AN INDUSTRIAL TRUCK

CROSS REFERENCE TO RELATED APPLICATION

This application is a continuation-in-part of U.S. patent application Ser. No. 08/547,701 filed on Oct. 19, 1995, now abandoned.

BACKGROUND OF THE INVENTION

1. Field of the Invention

This invention relates generally to driver safety devices on industrial trucks, and more particularly to restraint devices for drivers of industrial trucks wherein the driver's cab is at least partially open.

2. Brief Description of the Prior Art

Industrial trucks, such as fork-lift trucks, are usually manufactured and operated with at least a partially open driver's cab. The reasons are that closed driver's cabs are unnecessary because industrial trucks are predominantly used under cover in at least partially enclosed buildings and that closed driver's cabs are undesirable since they hinder ingress and egress to and from the driving position and impair the driver's field of view.

However, in the case of industrial trucks with at least a partially open driver's cab, there is a problem in that if the truck tips sideways, the driver can fall out of the cab and be trapped between the truck and the ground. Quite often, accidents of this kind are serious or even fatal for the driver. The most important factors which cause tipping of an industrial truck are cornering too rapidly, failure to lower the load when driving, and driving over or into obstructions.

Known driver restraint systems are only partially suitable for preventing a driver from falling out of the driver's cab if an industrial truck tips over. These driver restraint systems consist of the combination of a safety belt and fixed restraint arms disposed on both sides of the driver. However, in practical use, such a driver restraint system has serious drawbacks. The safety belt is an impediment to the driver when getting on and off the truck, so that often the belt is not worn, in which case the protective effect of the restraint system is eliminated. In addition, fixed restraint arms restrict the freedom of movement of the driver, e.g., the freedom to turn around when reversing the truck, and restrict the driver's field of view.

An object of the present invention is to provide a driver restraint device for an industrial truck having a partially open driver's cab which prevents the driver from falling out of the cab if the industrial truck tips over, but does not impede the driver's movements and does not restrict the driver's field of view.

SUMMARY OF THE INVENTION

A driver restraint means is provided for an industrial truck having a driver's cab which is at least partially open with a driver's seat located in the cab. The restraint means is movable between a retracted position and a restraining position wherein it prevents movement of a driver's body relative to the driver's seat. The restraint means includes a detection device for detecting tipping of an industrial truck and a tripping device operatively connected to the detection device for moving the restraint means from a first retracted position into a second restraining position and locking it therein.

During normal operation of an industrial truck, the restraint means is in a retracted position wherein it does not impede the driver in any way. When the detection device detects tipping of the industrial truck and signals this to the tripping device, the restraint means is moved into the restraining position and is locked there, to prevent the driver from falling out of the driver's cab. In one embodiment of the invention, the restraint means comprises at least one displaceable and/or pivotable arm.

In another embodiment of the invention, the restraint means is disposed behind the driver in its retracted position in the area of the backrest of the driver's seat and is adapted to close from the rear around the torso of the driver if the industrial truck tips over. In this arrangement, the driver can get on and off the truck unhindered by the restraint means in the retracted position. In another embodiment of the invention, the restraint means is secured to the driver's seat, preferably to the backrest of the driver's seat.

In a further embodiment of the invention, the restraint means is disposed at the side of a driver's seat cushion in its retracted position and closes from the side around the torso of a driver if the industrial truck tips over. In this embodiment, the driver restraint device is designed so that if the industrial truck tips over, the restraint means is initially moved upwardly and is then closed from the side around the torso of the driver. This arrangement ensures that the driver is not hindered when getting on and off the truck and that the restraint means is brought into the restraining position with a short pivoting movement in the event the truck tips over.

To precisely define the pivoting movement of the restraint means, it is advantageous to have at least one slide for guiding the movement of the restraint means. Advantageously, the tripping device is disposed in the area of the backrest of the driver's seat.

In a further embodiment of the invention, the restraint means is disposed at the side of the driver's seat cushion in the retracted position and is pivoted upwardly about a substantially horizontal pivot axis if the industrial truck tips over. In this case, the pivoting movement of the restraint means is guided by a simple design measure.

In another advantageous embodiment, the pivot axis of the restraint means is substantially horizontal and extends in the longitudinal direction of the driver's seat. With this arrangement of the pivot axis, the restraint means is located beside the seat cushion of the driver's seat in the retracted position so that the driver is not hindered when getting on and off the truck.

Expediently, the restraint means is disposed in the area of the pelvis of the driver in the restraining position. In this case, the center of gravity of the driver's body is located in the area of the restraint means so that the driver is unlikely to topple out over the restraint means.

It is particularly advantageous if the restraint means is formed such that the driver is restrained on the driver's seat in both the lateral and the forward directions. Thus, the driver restraint device acts in the lateral direction and in the frontal direction if the industrial truck tips over.

Another advantageous embodiment provides that at least one pre-loaded spring is contained in the tripping device for the movement of the restraint means from the retracted position to the restraining position.

A simple embodiment of the driver restraint device is one in which access to the driver's cab is provided from one side only. In such a case, a fixed restraint means is provided on the side of the driver's cab opposite the cab access side and the restraint means is disposed on the cab access side and is movable from a retracted position into a restraining position. Since the driver always gets on and off the industrial truck on the same side, the driver is not impeded by the rigid restraint means located on the opposite side. Where access to the cab is afforded from both sides, restraint means on both sides of the seat are movable from a retracted position into the restraining position.

Expediently, at least one ratchet construction is provided in the tripping device for locking the restraint means in the restraining position.

In a further embodiment of a driver restraint device according to the invention, the restraint means includes at least one moving belt ring. In the retracted position, the belt ring is disposed above the driver in the area of the roof of the driver's cab. The driver restraint device is connected to two belt reels for permitting movement of the restraint means from the retracted position into the restraining position. The belts wind up automatically in the opposite direction so that the restraint means is secured to the tripping device with the belts wound up.

It is advantageous if belt guides are provided as part of the tripping device. The belt guides are electrically releasable to release the belts holding the restraint means if the industrial truck tips over. When the belts are released, they are wound by automatic winding belt reels and the restraint means is drawn into its restraining position and locked.

In one particularly advantageous driver restraint device according to the invention a switch is operatively connected to the tripping device for releasing the lock of the restraint means in the restraining position.

As a further embodiment of the invention, a net is provided as the restraint means.

In another embodiment of the invention, the detection device is an electric sensor which detects the angle of inclination of a truck about its longitudinal axis; the angle of inclination about its transverse axis; and/or the transverse acceleration of the truck. It is particularly advantageous if the detection device is disposed in the area of the driver's seat. Thus, the driver restraint device constitutes a compact unit which can be an addition to existing seats.

Further advantages and features of the invention are described in greater detail with reference to the exemplary embodiments shown diagrammatically in the accompanying drawing figures wherein like reference characters indicate like parts.

DETAILED DESCRIPTION OF THE PREFERRED EMBODIMENTS

Figure 1:
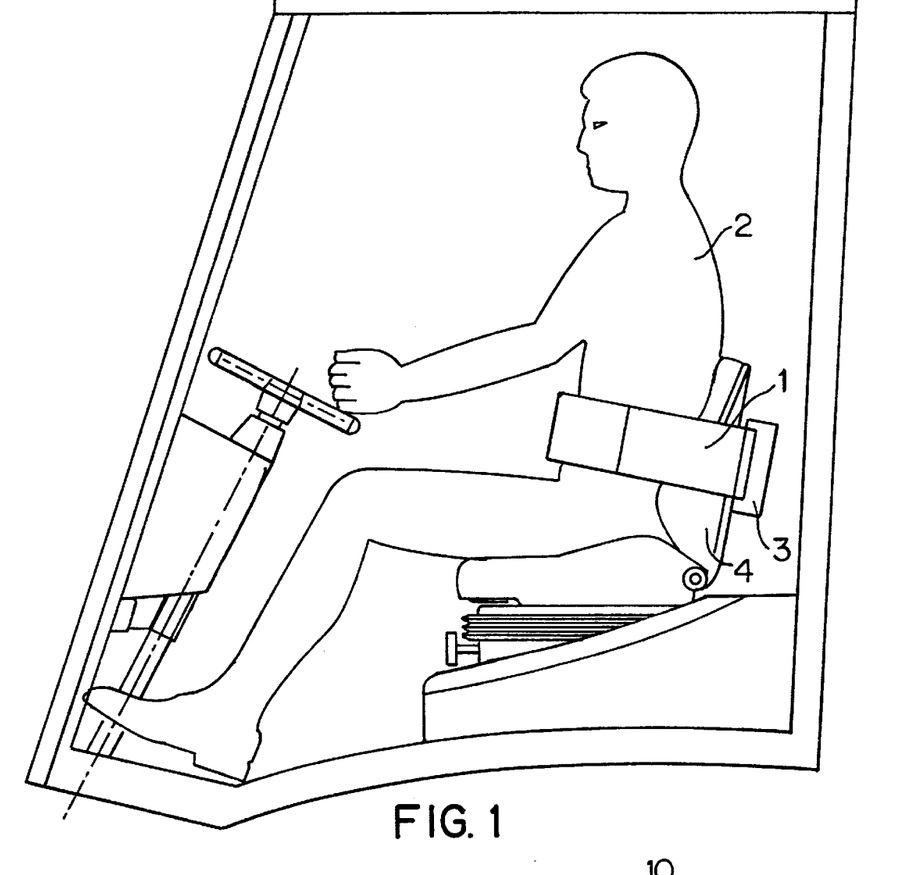
FIG. 1 is a side elevation view of a driver's cab with two arms as restraint means.
Figures 2, 3:
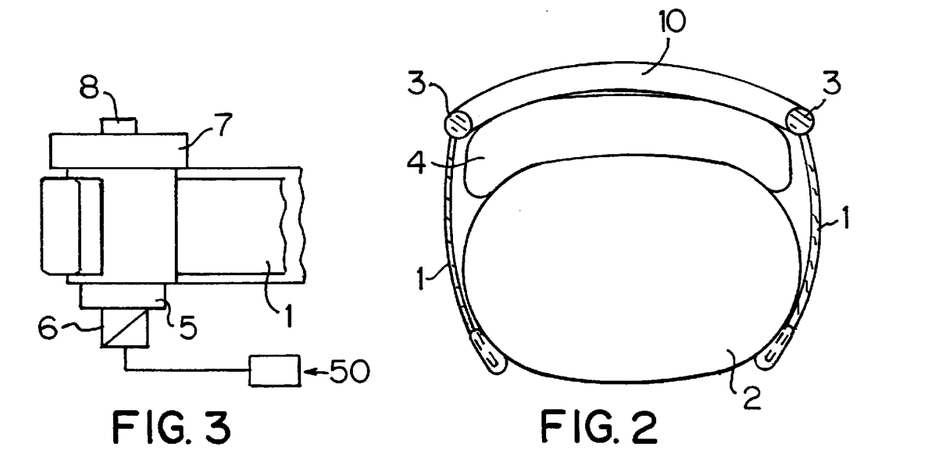
FIG. 2 is a top plan view of the restraint means shown in FIG. 1.
FIG. 3 is a side elevation view of a tripping device for an arm.

Referring now to FIGS. 1–2 of the drawings, a driver having a torso 2 sits on a seat in a partially open driver's cab of an industrial truck and leans against a backrest 4. A restraint means has two contact arms 1 which, in the restraining position, extend to the left and right about the driver's torso 2. Each contact arm 1 is secured to the backrest 4 of the driver's seat by means of a tripping device 3. The tripping device 3 secured to the backrest 4 presses the arm 1 against the driver's torso 2. In addition, an arm mounting member 10 is shown on the rear of backrest 4 upon which the arms 1 are located in the retracted position. The arms remain in the retracted position on member 10 behind the backrest 4 until the tripping devices are activated. The arms then move first laterally outwards, and then pivot about substantially vertical axes at the opposite sides of the backrest 4 into the restraining position where the arms 1 contact the driver's torso 2 to hold it in the driver's seat.

FIG. 3 of the drawings shows a tripping device 3 in detail for one of the arms 1. The tripping device includes a helical spring 5, an electric release trip 6, a ratchet construction 7 for locking the arm 1 in the retracted and restraining positions, and an electric switch 8 for releasing the arm. A detection means 50 is connected to the tripping devices 3 to trip the electrical release trips 6 when tipping of the truck is detected.

Figure 4:
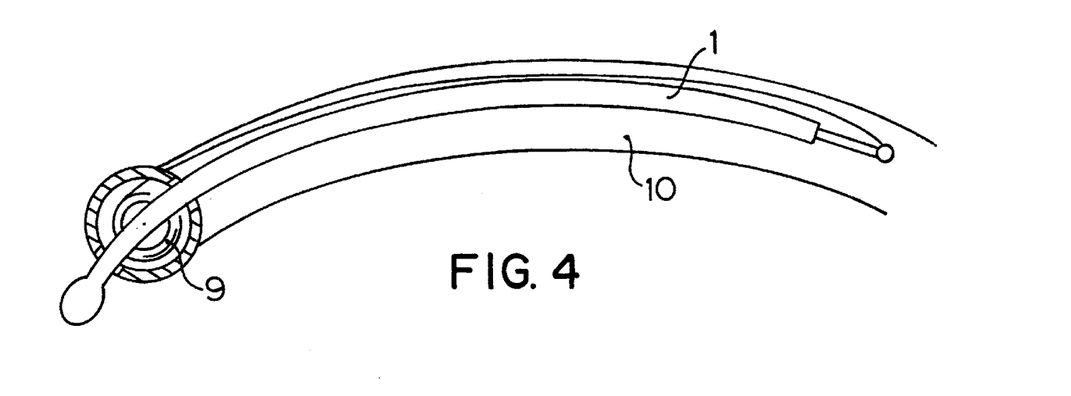
FIG. 4 is a top plan view of an arm in the retracted position.

FIG. 4 shows an arm 1 in the retracted position with an end attached to the free end of a coil spring 9. The spring 9 is a coiled band of resilient material, such as a spring steel, which in its unstressed condition forms a tight coil about a vertical spindle. The spring 9 is pre-loaded by straightening it out as the arm 1 is slid through a pivot bearing member to place the arm in the retracted position. A detent or pawl holds the arm in the retracted position and is released by an electric signal.

When the detent is released, the arm 1 slides through the bearing member to an intermediate position in which it extends substantially laterally outward from the seat back 4. The arm 1 then swings forward about the spindle axis to embrace the torso 2 of the driver. Alternatively, the sliding and swinging movements of arm 1 may occur simultaneously. An inclinometer or an accelerometer provides the electric signal to release the detent when tipping of the truck is detected.

Figure 5:
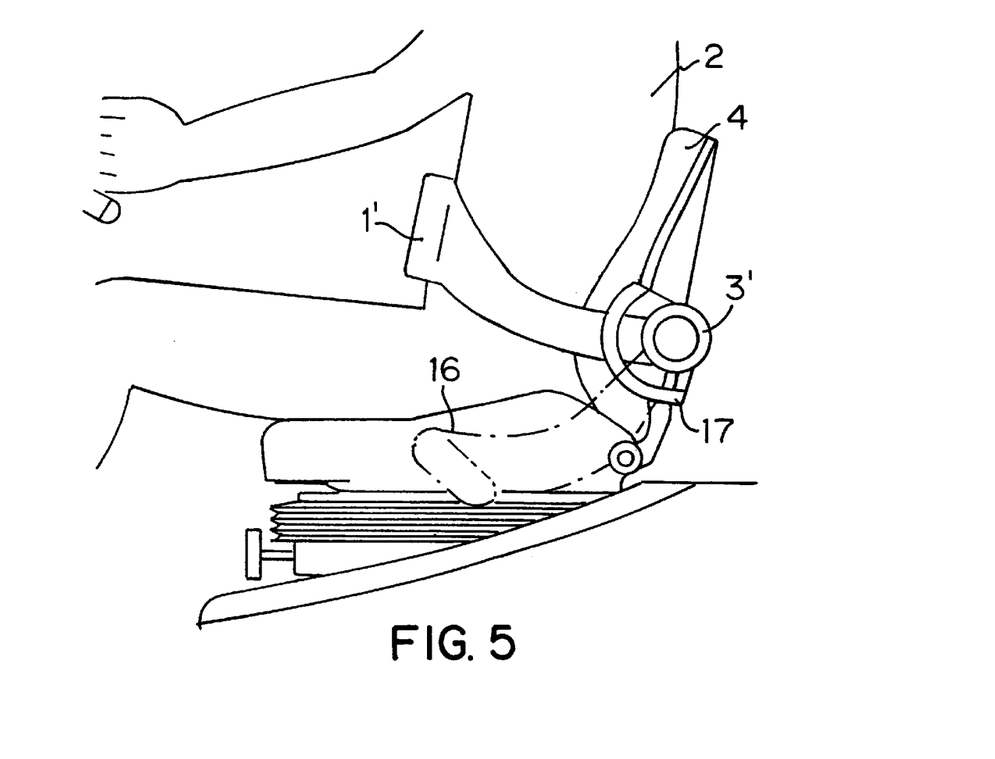
FIG. 5 is a side elevation view of a second embodiment of the invention having a driver restraint means having pivotable arms.
Figure 9:
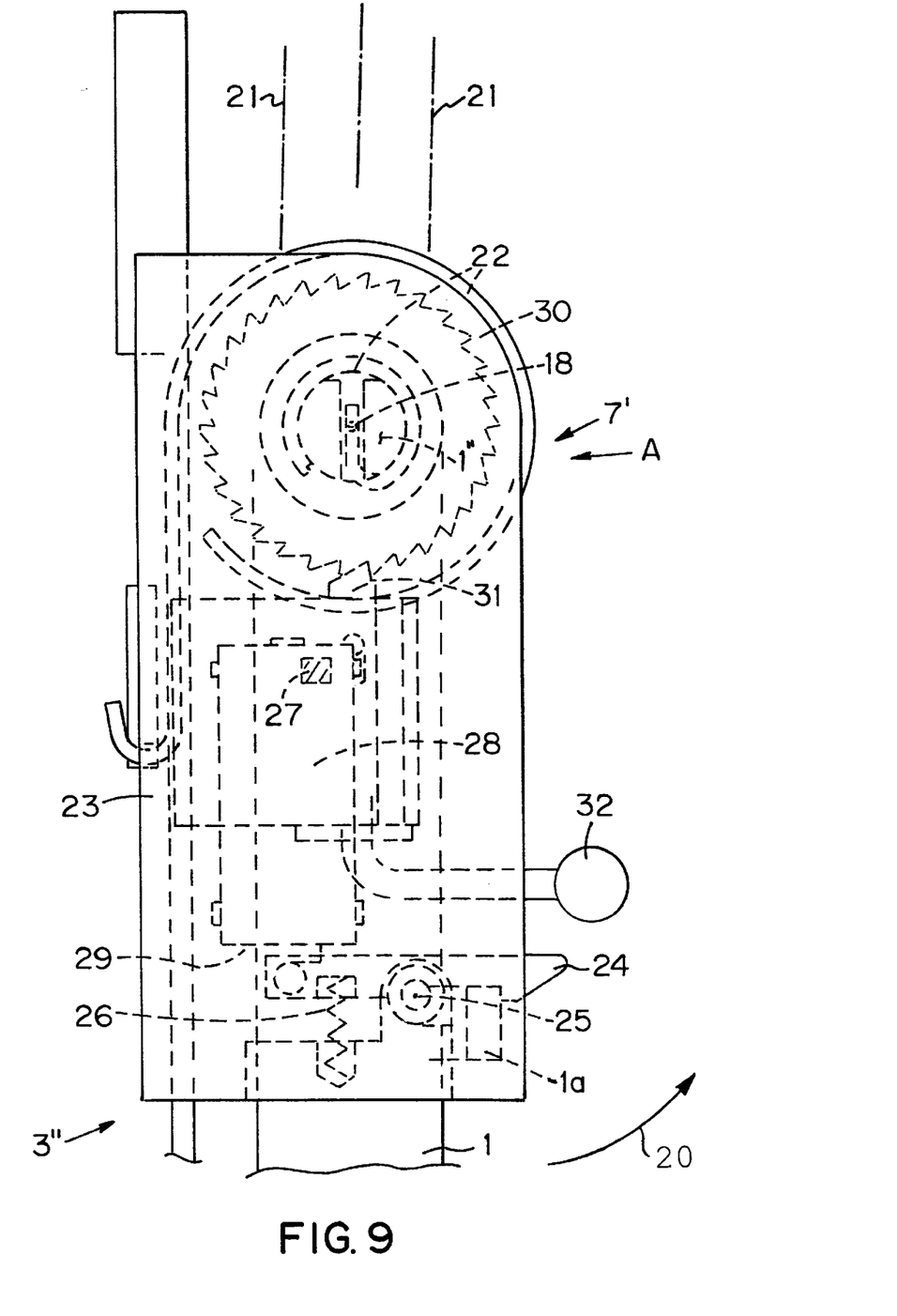
FIG. 9 is a side elevation view of another tripping device.
Figures 10, 11:
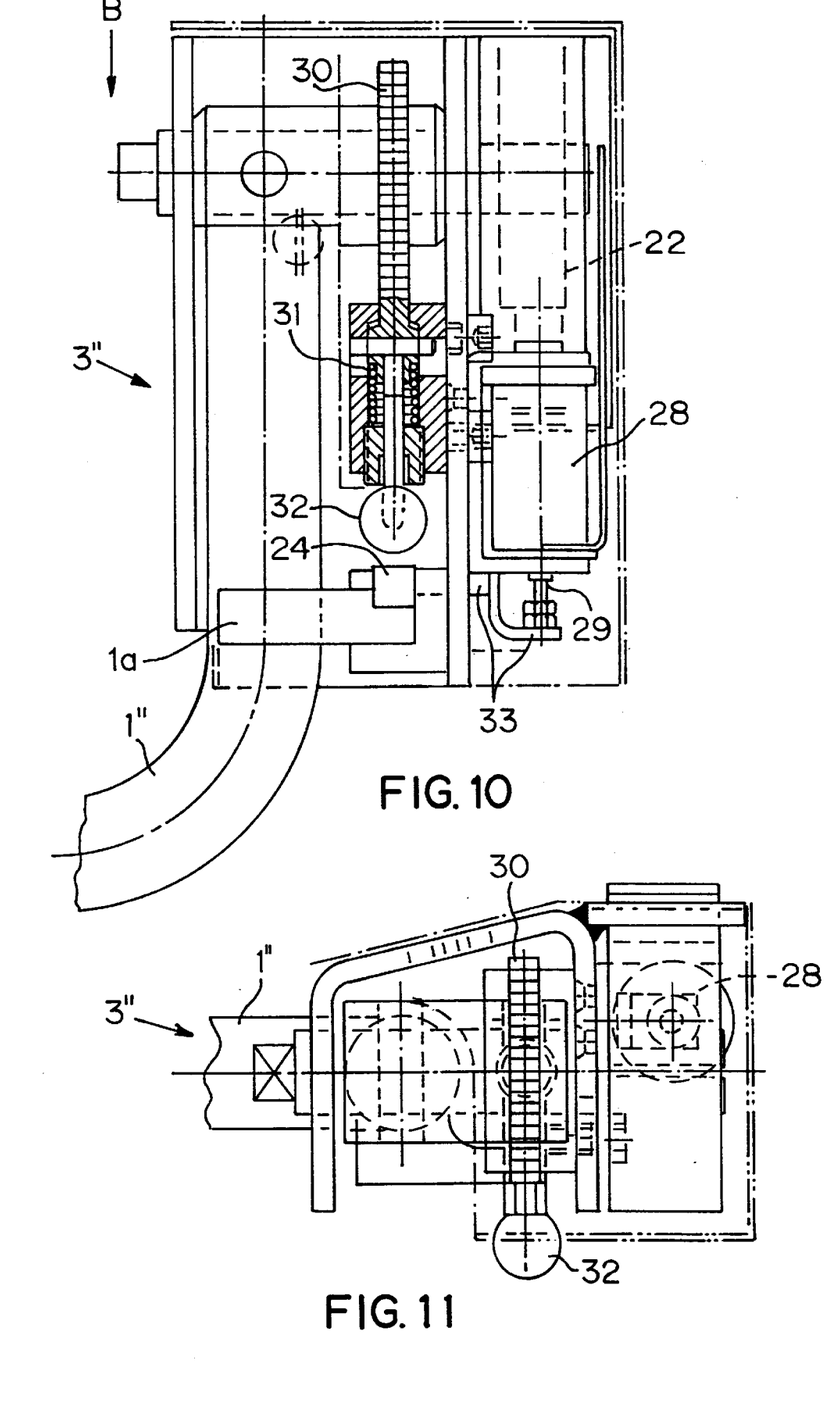
FIG. 10 is a view of the tripping device of FIG. 9 as seen in direction A of FIG. 9.
FIG. 11 is a view of the tripping device of FIG. 10 as seen in direction B of FIG. 10.

FIG. 5 of the drawings shows an alternative driver restraint means with lateral restraining arms 1', shown in solid lines in the restraining position and in the retracted position 16 in broken lines. The arms 1' move from the retracted position to the restraining position by pivoting about a generally transverse horizontal axis. If the industrial truck tips over, the arms 1' are moved into the restraining position by the tripping device 3' and the movement is guided by the curved slide 17. A tripping device, such as tripping device 3 discussed hereinabove, can be used with the embodiment shown in FIG. 5 of the drawings as the tripping device 3'. Alternatively, a tripping device 3" as shown in FIGS. 9–11 of the drawings and discussed hereinbelow with respect to the embodiments shown in FIGS. 6 and 7 of the drawings can be used.

Figure 6:
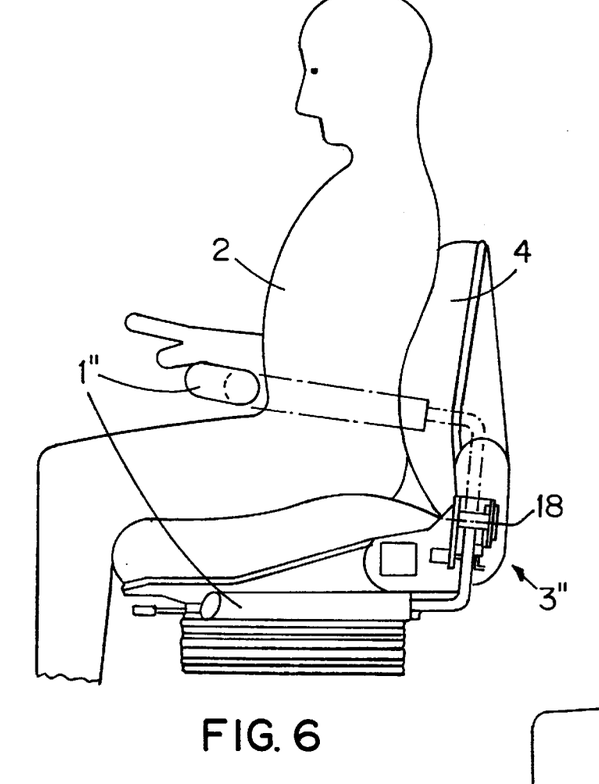
FIG. 6 is a side elevation view of another embodiment of the invention having driver restraint means having pivotable arms.
Figure 7:
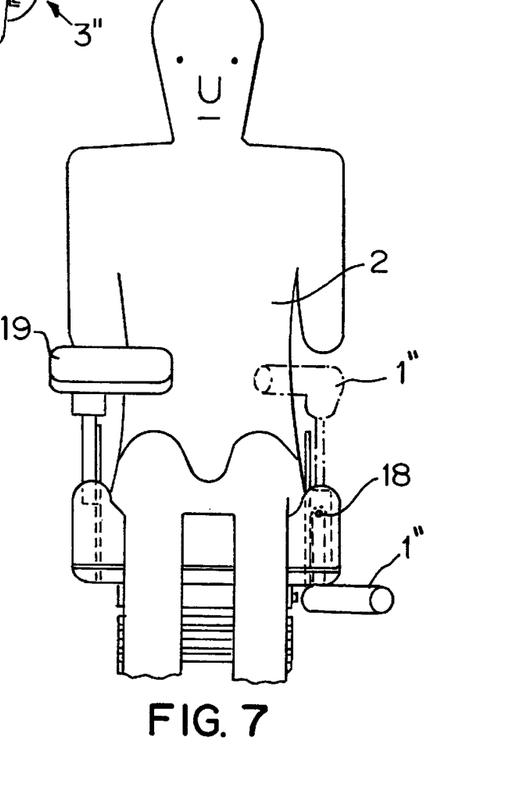
FIG. 7 is a front elevation view of a driver restraint means with one rigid arm and one pivotable arm.

FIGS. 6 and 7 of the drawings show a driver restraint device with one fixed arm 19 and one pivotable arm 1". The restraining position of the arm 1" is shown in broken lines. The pivot axis 18 of the arm 1" is oriented generally in the longitudinal direction of the vehicle and is disposed essentially horizontally alongside the lower portion of the edge of the backrest of the driver's seat. The pivoted arm 1" is moved into the restraining position by a tripping device 3", which is shown in FIGS. 9–11 of the drawings. As will be appreciated from FIG. 7, the tripping device 3" initially moves the arm 1" away from the driver seat in a lateral or sideways direction and then closes the arm 1" around the driver's torso from the side.

In its retracted position, the pivoted arm 1" extends downwardly from the pivot axis 18 and forwardly below the driver's seat. A detent or pawl on the ratchet construction of the tripping device 3" holds the arm 1" in the retracted position against the force of a helical spring which urges the arm to pivot upwardly about the pivot axis 18 into a restraining position in which the restraining arm 1" extends forwardly from the seat back 4 alongside the driver's torso 2. The front ends of the arms 1" and 19 are bent inwardly to prevent the driver from moving forwardly off the seat.

An inclinometer or an accelerometer, or other detection device for detecting tipping of the truck, is operatively connected to the detent to provide an electric signal to the electric trip to release the detent if the truck tips. The arm 1" then pivots upwards into the restraining position. The two arms 19 and 1" are shaped so that the driver cannot move sideways or forwardly relative to the driver's seat.

FIG. 9 depicts the tripping device 3" particularly suited for the embodiment shown in FIGS. 6 and 7 of a driver restraint arrangement with a pivotable arm 1". The arm 1" is mounted to rotate around the pivot axis,18 and is shown in FIG. 9 in its neutral position. In the event of tipping of the industrial truck, the arm 1" moves in the direction of the arrow 20 into the restraint position 21 represented by the broken lines. For this, the arm 1" is driven by a pre-loaded spiral spring 22, of which the internal and external coils are depicted. The spiral spring 22 is supported internally on a part of the arm 1" and externally on a housing 23 which is stationary relative to the driver's seat.

During normal operation of the industrial truck, the arm 1" is held in the neutral position by means of a lock 24 movable around an axis 25. The lock 24 engages an extension 1a on the arm 1". During normal operation of the industrial truck, the lock 24 is held by a spring 26 in the position depicted in FIG. 9.

Tipping of the industrial truck is detected by an electric sensor 27, which thereupon feeds an appropriate signal to an electromagnet 28. This electromagnet 28 has a movable piston 29, which is moved downward by magnetism in the event of tipping of the industrial truck. The piston 29 moves the lock 24 counterclockwise as shown in FIG. 9 against the force of the spring 26 such that the extension la of the arm 1" is released. The spiral spring 22 consequently moves the arm 1" into the restraint position 21.

A toothed disk 30, which, along with a spring-loaded pin 31, forms a ratchet construction 7', is also attached to the arm 1". The movement of the arm 1" in the direction 20 is not impeded by the ratchet construction 7' since here the pin 31 is pressed downward due to the shape of the toothed disk 30 and of the pin 31. Self-activated movement of the arm 1" in the opposite direction is, in contrast, prevented by the ratchet construction 7'. The arm 1" is thus locked in the restraint position. Release of this locking is possible by pressing down on a lever 32 connected to the pin 31, whereby the toothed disk 30 and the arm 1" are released.

FIG. 10 shows the tripping device 3" as seen in direction A shown in FIG. 9. As can be seen, the piston 29 of the electromagnet 28 is connected by an angular extension 33 to the lock 24.

FIG. 11 shows the tripping device 3" as seen in direction B of FIG. 10.

Figure 8:
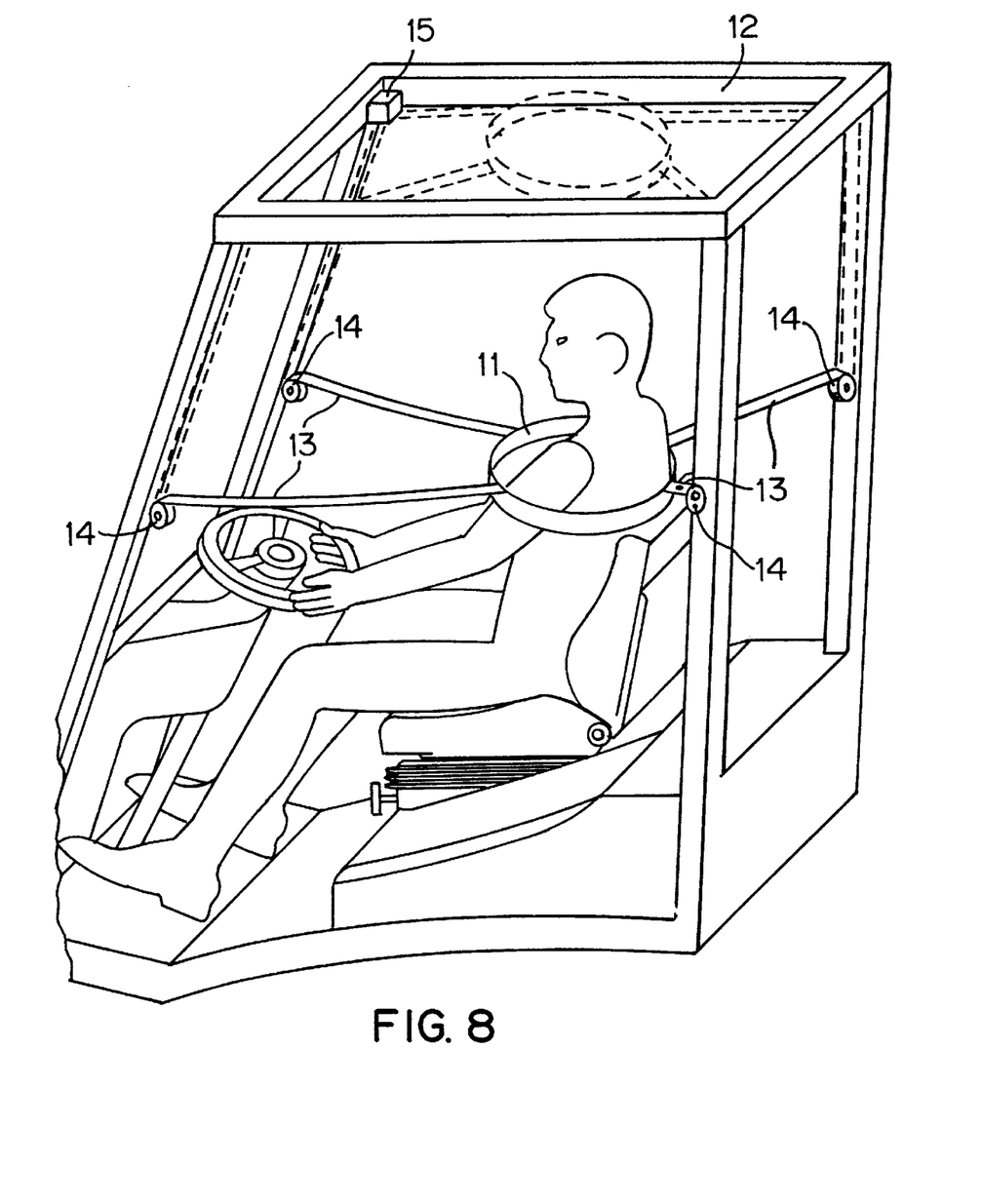
FIG. 8 is a partial perspective view of a driver's cab with a belt ring as the restraint means.

FIG. 8 of the drawings shows a third embodiment of the invention wherein the driver's cab is fitted with a belt loop 11 as the restraint means. In the retracted position, the belt loop 11 is held adjacent to the lower surface of the roof 12 of the driver's cab, as shown by the dotted lines. The belt loop 11 is secured to four belts 13 which can be wound onto belt reels 14. The belts 13 are held in the retracted position by electrically releasable belt guides 15 mounted in each corner of the cab at roof height. A tipping detector controls the operation of the belt guides 15, causing them to release the belts 13 if the truck tips. The belts 13 are wound onto the belt reels 14 and the tension on the belts 13 holds the belt loop 11 open. The belt loop 11 drops over the driver's head to extend around the driver's upper body and ratchet means in the belt reels 14 prevent the belts 13 from completely unrolling. Thus, the driver is secured against both lateral and forward movements. Although four belts 13 are shown, it will be understood by those skilled in the art that three retractable belts may be used, or a combination of one or more fixed and one or more retractable belts may be used, provided that the belt loop is held open so that it can drop over the driver's head if the truck tips.

It will also be understood by those skilled in the art that a net may be used in place of the belt loop 11.

Having described the presently preferred embodiments of the invention, it is to be understood that the invention may be otherwise embodied within the scope of the appended claims.

I claim:

1. An industrial truck having a partially open driver cab and having a longitudinal direction, a driver seat in said driver cab, and a restraining device for a driver in said driver cab, said restraining device including driver restraint means mounted in said driver cab, said driver restraint means including a movable contact member for holding a driver in said driver seat and movable between a first retracted position and a second driver restraining position, a tripping means operatively connected to said movable contact member for moving said movable contact member between said first retracted position and said second driver restraining position, a detection means for detecting a tipping motion of the industrial truck operatively connected to said tripping means to actuate said tripping means for moving said movable contact member from said first retracted position into said second driver restraining position and for locking said movable contact member in said second driver restraining position, wherein said contact member initially moves away from said driver seat in a sideways direction and then closes to said restraining position from the side of said driver seat.

2. An industrial truck according to claim 1, wherein said contact member comprises at least one displaceable arm.

3. An industrial truck according to claim 2, wherein said at least one displaceable arm is pivotable from said first retracted position to said second driver restraining position by said tripping means.

4. An industrial truck according to claim 1, wherein said restraint means is secured to said driver seat.

5. An industrial truck according to claim 4, wherein said driver seat includes a backrest and said contact member is secured to said backrest of said driver seat.

6. An industrial truck according to claim 1, wherein said contact member is disposed beside said driver seat in said first retracted position and said tripping means closes said contact member around the torso of a driver from the side when said detection means senses a tipping motion of the industrial truck.

7. An individual truck according to claim 1, wherein said contact member is disposed beside said driver seat on a generally horizontal pivot axis in said first retracted position and is pivoted upwardly about said generally horizontal pivot axis into said second driver restraining position.

8. An industrial truck according to claim 7, wherein said pivot axis of said contact member is oriented generally in the longitudinal direction of said industrial truck.

9. An industrial truck according to claim 1, wherein said contact member is disposed in the area of the pelvis of a driver when in said second driver restraining position.

10. An industrial truck according to claim 1, wherein said contact member is shaped to restrain a driver in said driver seat in both the lateral direction and the forward direction.

11. An industrial truck according to claim 1, wherein said driver seat has a backrest and said tripping means is disposed in the area of said backrest of said driver seat.

12. An industrial truck according to claim 1, wherein said tripping means includes at least one pre-loaded spring for movement of said contact member from said first retracted position into said second driver restraining position.

13. An industrial truck according to claim 1, wherein said tripping means includes at least one ratchet construction for locking said contact member in said second driver restraining position.

14. An industrial truck according to claim 1, wherein said detection means is an electric sensor for detecting at least one of the angle of inclination of the industrial truck about a truck longitudinal axis, the angle of inclination of the industrial truck about a truck transverse axis and the transverse acceleration of the industrial truck.

15. An industrial truck according to claim 1, wherein said detection means is located in the area of said driver seat.

16. An industrial truck having a partially open driver cab, a driver seat in said driver cab, and a restraining device for a driver in said driver cab, said restraining device including driver restraint means mounted in said driver cab, said driver restraint means including a movable contact member for holding a driver in said driver seat and movable between a first retracted position and a second driver restraining position, a tripping means operatively connected to said movable contact member for moving said movable contact member between said first retracted position and said second driver restraining position, a detection means for detecting a tipping motion of the industrial truck operatively connected to said tripping means to actuate said tripping means for moving said movable contact member from said first retracted position into said second driver restraining position and for locking said movable contact member in said second driver restraining position, wherein said contact member is disposed beside said driver seat in said first retracted position and said tripping means closes said contact member around the torso of a driver from the side when said detection means senses a tipping motion of the industrial truck and wherein said tripping means initially moves said contact member away from said driver seat in a sideways direction and closes said contact member around the torso of the driver from the side.

17. An industrial truck having a partially open driver cab, a driver seat in said driver cab, and a restraining device for a driver in said driver cab, said restraining device including driver restraint means mounted in said driver cab, said driver restraint means including a movable contact member for holding a driver in said driver seat and movable between a first retracted position and a second driver restraining position, a tripping means operatively connected to said movable contact member for moving said movable contact member between said first retracted position and said second driver restraining position, a detection means for detecting a tipping motion of the industrial truck operatively connected to said tripping means to actuate said tripping means for moving said movable contact member from said first retracted position into said second driver restraining position and for locking said movable contact member in said second driver restraining position, wherein said movable contact member is on one side of said driver seat and said restraint means includes a stationary contact member on the opposite side of said driver seat.

* * * * *